US010632541B2

(12) United States Patent
Ikenaga et al.

(10) Patent No.: US 10,632,541 B2
(45) Date of Patent: Apr. 28, 2020

(54) ROTARY CUTTING TOOL

(71) Applicants: SUMITOMO ELECTRIC HARDMETAL CORP., Itami-shi (JP); DMG MORI CO., LTD., Yamatokoriyama-shi (JP)

(72) Inventors: Shinya Ikenaga, Itami (JP); Junya Okida, Itami (JP); Morihiro Hideta, Yamatokoriyama (JP)

(73) Assignees: Sumitomo Electric Hardmetal Corp., Itami-shi (JP); DMG Mori Co., Ltd., Yamatokoriyama-shi (JP)

( * ) Notice: Subject to any disclaimer, the term of this patent is extended or adjusted under 35 U.S.C. 154(b) by 0 days.

(21) Appl. No.: 15/769,622

(22) PCT Filed: Aug. 23, 2016

(86) PCT No.: PCT/JP2016/074479
§ 371 (c)(1),
(2) Date: Apr. 19, 2018

(87) PCT Pub. No.: WO2017/068850
PCT Pub. Date: Apr. 27, 2017

(65) Prior Publication Data
US 2018/0304377 A1   Oct. 25, 2018

(30) Foreign Application Priority Data
Oct. 23, 2015   (JP) .................. 2015-209133

(51) Int. Cl.
B23B 27/22   (2006.01)
B23B 27/16   (2006.01)
(Continued)

(52) U.S. Cl.
CPC .......... B23B 27/1622 (2013.01); B23B 27/12 (2013.01); B23B 27/143 (2013.01);
(Continued)

(58) Field of Classification Search
CPC .......... B23B 27/143; B23B 2200/0461; B23B 2200/08; B23B 2200/087;
(Continued)

(56) References Cited

U.S. PATENT DOCUMENTS 4,178,818 A    12/1979   Yascheritsyn et al.
4,880,338 A *  11/1989   Stashko ............... B23B 27/143
                                                         407/114
(Continued)

FOREIGN PATENT DOCUMENTS

CN    1539585 A    10/2004
CN    1592668 A     3/2005
(Continued)

OTHER PUBLICATIONS

Office Action dated Nov. 20, 2018 in counterpart Chinese Patent Application No. 201680061895.7.
(Continued)

Primary Examiner — Nicole N Ramos
(74) Attorney, Agent, or Firm — Baker Botts L.L.P.; Michael A. Sartori

(57) ABSTRACT

A rotary cutting tool insert according to one embodiment of the present invention includes: an annular rake face provided with at least one recess portion; and a cutting edge formed at an outer circumference of the rake face, the recess portion having a width of more than or equal to 1.2 mm and less than or equal to 3.0 mm in a circumferential direction of the rake face, a distance between the cutting edge and an end of the recess portion at the outer circumference side of the rake face being more than or equal to 0.1 mm and less than or equal to 0.5 mm. According to the rotary cutting tool insert according to the one embodiment of the present invention, roughness of a processed surface and vibration due to a cutting process can be prevented.

8 Claims, 7 Drawing Sheets

(51) Int. Cl.
  *B23B 27/12* (2006.01)
  *B23B 27/14* (2006.01)
(52) U.S. Cl.
  CPC ...... *B23B 27/22* (2013.01); *B23B 2200/0461* (2013.01); *B23B 2200/08* (2013.01); *B23B 2200/087* (2013.01); *B23B 2200/323* (2013.01)
(58) Field of Classification Search
  CPC ........ B23B 2200/242; B23B 2200/245; B23B 2200/323; B23B 2200/325; B23C 2200/045; B23C 2200/08; B23C 2200/086; B23C 2200/087; B23C 2200/20; B23C 2210/486
  See application file for complete search history.

(56) References Cited

U.S. PATENT DOCUMENTS

| | | | | |
|---|---|---|---|---|
| 4,988,242 | A * | 1/1991 | Pettersson | B23B 27/143 407/113 |
| 7,458,753 | B1 * | 12/2008 | Niebauer | B23B 27/143 407/113 |
| 2003/0086767 | A1 * | 5/2003 | Wiman | B23B 27/141 407/114 |
| 2007/0101837 | A1 * | 5/2007 | Hyatt | B23B 1/00 82/1.11 |
| 2007/0196191 | A1 | 8/2007 | Dessoly | |
| 2008/0317558 | A1 | 12/2008 | Niebauer et al. | |
| 2011/0241409 | A1 | 10/2011 | Swope et al. | |
| 2012/0170987 | A1 * | 7/2012 | Komatsuka | B23B 27/141 407/114 |
| 2013/0094914 | A1 * | 4/2013 | Majima | B23B 27/143 407/114 |
| 2015/0231702 | A1 * | 8/2015 | Okida | B23B 27/12 407/11 |
| 2015/0298226 | A1 * | 10/2015 | Deguchi | B23C 5/109 409/131 |
| 2016/0243624 | A1 * | 8/2016 | Tomoda | B23B 27/143 |
| 2017/0209935 | A1 * | 7/2017 | Furusawa | B23B 27/14 |
| 2017/0259356 | A1 | 9/2017 | Lee et al. | |
| 2019/0039146 | A1 * | 2/2019 | Bar Hen | B23B 27/145 |

FOREIGN PATENT DOCUMENTS

| | | |
|---|---|---|
| CN | 1859992 A | 11/2006 |
| CN | 1902377 A | 1/2007 |
| CN | 101011755 A | 8/2007 |
| CN | 101301691 A | 11/2008 |
| CN | 102213096 A | 10/2011 |
| CN | 102470445 A | 5/2012 |
| DE | 202005012862 U1 | 12/2006 |
| EP | 1964631 A2 | 9/2008 |
| EP | 2926933 A1 | 10/2015 |
| GB | 2057939 A | 4/1981 |
| JP | S58-169902 U | 11/1983 |
| JP | S59-143602 U | 9/1984 |
| JP | H06-170607 A | 6/1994 |
| JP | H11-245105 A | 9/1999 |
| JP | 2007-504011 A | 3/2007 |
| KR | 10-1529524 B1 | 6/2015 |
| WO | 03/045621 A1 | 6/2003 |
| WO | 2005/021191 A2 | 3/2005 |
| WO | 2005/066459 A1 | 7/2005 |
| WO | 2011/010301 A1 | 1/2011 |

OTHER PUBLICATIONS

Extended European Search Report dated May 13, 2019 in EP Application No. 16857168.

* cited by examiner

ROTARY CUTTING TOOL

TECHNICAL FIELD

The present invention relates to a cutting tool insert and a cutting tool using the cutting tool insert, particularly, a rotary cutting tool insert and a rotary cutting tool using the rotary cutting tool insert.

The present application claims a priority based on Japanese Patent Application No. 2015-209133 filed on Oct. 23, 2015, the entire content of which is incorporated herein by reference.

BACKGROUND ART

A conventional cutting process is performed by biasing a cutting tool including a cutting tool insert against a workpiece (target object) that is being rotated. However, in such a cutting method, a cutting point in the cutting tool insert during the cutting process is unchanged, with the result that resultant cutting heat and cutting load are concentrated on the cutting point.

In order to solve the problem of such a conventional cutting process, a spinning process has been introduced (for example, Patent Document 1). In the spinning process, a rotary cutting tool including a rotary cutting tool insert and rotating around an axis is biased against a workpiece that is being rotated, thereby cutting it with a cutting edge continuous in a direction of rotation of the tool. In such a spinning process, the cutting point of the rotary cutting tool insert is changed moment by moment during the cutting process. Therefore, the rotary cutting tool insert, which has been heated by generated cutting heat, is cooled during the rotation of the rotary cutting tool. Moreover, during the rotation, cutting load on the rotary cutting tool insert is distributed over the entire circumference of the cutting tool insert.

As a result of cutting the workpiece by the cutting tool insert, swarf is inevitably generated. When long, continuous swarf is generated, the swarf is wound around the workpiece, thus damaging a finished surface of the workpiece, disadvantageously. In view of this, in order to avoid such long, continuous swarf, the swarf needs to be handled appropriately.

However, the cutting tool insert described in Patent Document 1 is not provided with a breaker for cutting generated swarf to be short, with the result that the generated swarf cannot be handled appropriately, disadvantageously.

In order to cope with such a problem, there has been proposed a rotary cutting tool insert in which a projection is provided at an upper portion of a cutting edge thereof. Also, there has been proposed a rotary cutting tool insert in which a groove is provided at a portion of a cutting edge thereof (for example, Patent Document 2 and Patent Document 3).

CITATION LIST

Patent Document

PTD1: U.S. Pat. No. 4,178,818

PTD2: Japanese Patent Laying-Open No. 06-170607

PTD3: Japanese National Patent Publication No. 2007-504011

SUMMARY OF INVENTION

Technical Problem

A rotary cutting tool insert according to one embodiment of the present invention includes: an annular rake face provided with at least one recess portion; and a cutting edge formed at an outer circumference of the rake face, the recess portion having a width of more than or equal to 1.2 mm and less than or equal to 3.0 mm in a circumferential direction of the rake face, a distance between the cutting edge and an end of the recess portion at the outer circumference side of the rake face being more than or equal to 0.1 mm and less than or equal to 0.5 mm.

DESCRIPTION OF EMBODIMENTS

Object of the Present Disclosure

Figure 1:
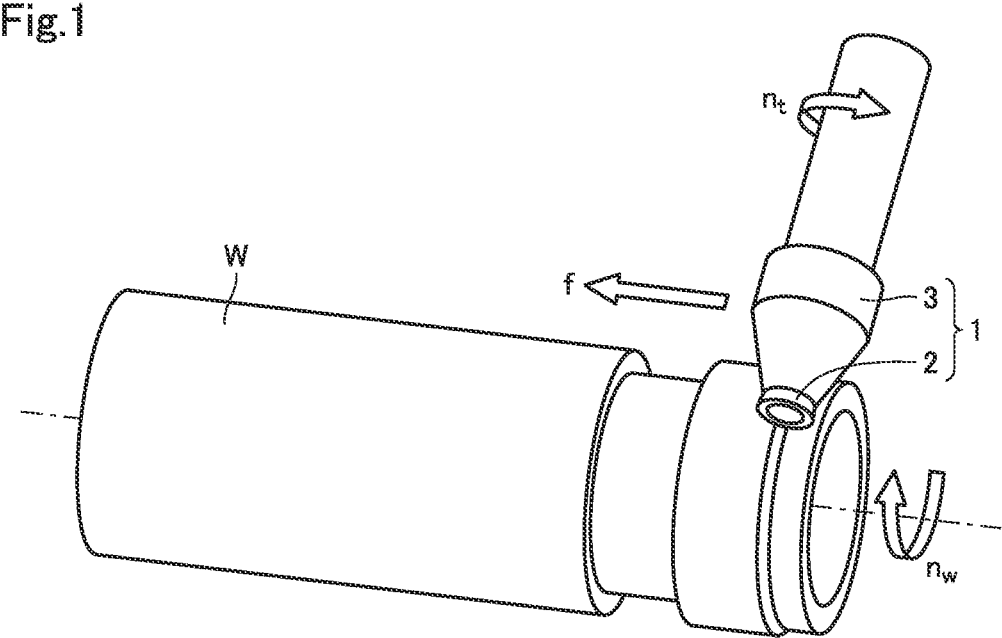
FIG. 1 is a perspective view showing an overview of a spinning process using a rotary cutting tool.

In the rotary cutting tool insert in which the projection is provided at the upper portion of the cutting edge thereof, swarf is brought into contact with and curved by the projection provided at the upper portion of the cutting edge, thereby dividing the swarf. Hence, the swarf can be divided to be short.

However, in such a rotary cutting tool insert, the swarf is brought into contact with and forcibly curved by the projection provided at the upper portion of the cutting edge. Since the cutting temperature is less likely to be increased in the spinning process than that in a normal turning process, a severe process condition is often set. Moreover, such a projection constrains the swarf in the circumferential direction of the rotary cutting tool insert. Therefore, when the swarf is brought into contact with such a projection during the spinning process, resistance and vibration resulting from the cutting become large, with the result that the insert may be broken.

In the rotary cutting tool insert in which the groove is provided at the portion of the cutting edge thereof, due to rotation of the workpiece and the rotary cutting tool insert, the both ends of the groove provided at the portion of the cutting edge of the rotary cutting tool insert pass through the cutting point spirally. Therefore, whenever the groove provided at the portion of the cutting edge of the rotary cutting tool insert passes through the workpiece, the swarf is divided spirally. Hence, the swarf can be divided to be short.

However, in the rotary cutting tool insert in which the groove is provided at the portion of the cutting edge thereof, there is a discontinuous portion in the cutting edge due to the groove provided at the portion of the cutting edge. Therefore, in the rotary cutting tool insert in which the groove is provided at the portion of the cutting edge thereof, vibration resulting from the cutting becomes large and a cut surface becomes rough due to the cutting, disadvantageously.

In view of the problems above, the present disclosure provides a rotary cutting tool insert and a rotary cutting tool using the rotary cutting tool insert, by each of which swarf can be divided to be short and roughness of a cut surface and vibration due to a cutting process can be prevented.

Advantageous Effect of the Present Disclosure

According to the description above, swarf can be divided to be short and roughness of a cut surface and vibration due to a cutting process can be prevented.

DESCRIPTION OF EMBODIMENTS OF THE PRESENT INVENTION

First, embodiments of the present invention are listed and described.

(1) A rotary cutting tool insert according to one embodiment of the present invention includes: an annular rake face provided with at least one recess portion; and a cutting edge formed at an outer circumference of the rake face, the recess portion having a width of more than or equal to 1.2 mm and less than or equal to 3.0 mm in a circumferential direction of the rake face, a distance between the cutting edge and an end of the recess portion at the outer circumference side of the rake face being more than or equal to 0.1 mm and less than or equal to 0.5 mm.

In a spinning process, a cutting point is changed moment by moment, so that increase in temperature of swarf is small. Accordingly, when the recess portion passes through the cutting point, the swarf is unlikely to be softened and enter the recess portion. As a result, the swarf is hardly brought into contact with the inner circumferential surface of the recess portion, thereby reducing friction between the rake face and the swarf. Accordingly, the movement speed of the swarf running in contact with the rake face is momentarily increased. As a result, the swarf is curved and is divided to be short. Moreover, by providing the recess portion to be separated from the cutting edge, there is no discontinuous portion in the cutting edge, thereby suppressing generation of vibration and roughness of the cut surface due to cutting.

(2) In the rotary cutting tool insert according to (1), the recess portion may have a maximum depth of more than or equal to 0.15 mm and less than or equal to 0.25 mm.

When the maximum depth of the recess portion is less than 0.15 mm, the swarf is brought into contact with the recess portion, with the result that the effect of dividing the swarf is decreased. On the other hand, when the maximum depth of the recess portion is more than 2.5 mm, strength is decreased at a portion at which the recess portion is provided. Moreover, the recess portion having a maximum depth of more than or equal to 0.15 mm and less than or equal to 0.25 mm serves as an oil reservoir in the case of a wet process. Therefore, by providing the recess portion having such a maximum depth, strength can be maintained at the portion at which the recess portion is provided and the swarf can be divided to be short, thereby further suppressing occurrence of vibration due to the cutting.

(3) In the rotary cutting tool insert according to (1), a shape of the recess portion may be a circular shape.

With such a shape of the recess portion, the swarf can be unlikely to enter the recess portion. Further, with such a shape of the recess portion, there is no corner in the recess portion, whereby the swarf can be unlikely to be melted and joined to the recess portion.

(4) In the rotary cutting tool insert according to (1), the number of the recess portions is more than or equal to 8 and less than or equal to 15.

When there is one recess portion, the recess portion passes through the cutting point before the swarf is sufficiently curved. Therefore, in order to greatly curve the swarf to improve the effect of dividing the swarf, it is desirable to increase the number of the recess portions and narrow an interval between the recess portions. On the other hand, when the number of the recess portions is large, strength is decreased at portions at which the recess portions are provided. Therefore, with the above-described number of the recess portions, the strength is maintained at the portions at which the recess portions are provided, and the swarf can be divided to be short.

(5) In the rotary cutting tool insert according to (1), the rake face may have a width of more than or equal to 1.5 mm and less than or equal to 3.0 mm in a radial direction, a level difference may be provided at an inner circumferential side of the rake face, and the recess portion may extend to reach the level difference.

Since the recess portion extends to reach the level difference at the inner circumference side of the rake face, the swarf is unlikely to be brought into contact with the rotary cutting tool insert even if the swarf enters the inner circumferential side of the recess portion during the cutting process. Thus, by providing such a recess portion, occurrence of vibration resulting from cutting can be further suppressed.

(6) In the rotary cutting tool insert according to any one of (1) to (5), the rake face can be provided with an annular breaker groove, the breaker groove can have a curvature radius of more than or equal to 10 mm and less than or equal to 30 mm in a cross section perpendicular to the circumferential direction, and a distance between the cutting edge and an end of the breaker groove at the outer circumference side of the rake face can be more than or equal to 0.1 mm and less than or equal to 0.3 mm.

By providing such a breaker groove, the swarf can be divided to be shorter, and the cutting vibration can be further suppressed from being increased due to the dividing of the swarf.

(7) A rotary cutting tool according to one embodiment of the present invention includes the rotary cutting tool insert recited in any one of (1) to (6).

With such a rotary cutting tool insert, the swarf can be divided to be short and roughness of a cut surface and vibration due to a cutting process can be prevented.

Details of Embodiments of the Present Invention

The following describes a first embodiment of the present invention with reference to figures. It should be noted that the same or corresponding portions in the figures are given the same reference characters. Moreover, at least a part of the embodiments described below may be appropriately combined.

[Configuration and Operation of Rotary Cutting Tool]

FIG. 1 shows an overview of a spinning process employing a rotary cutting tool insert and a rotary cutting tool including the rotary cutting tool insert. As shown in FIG. 1, the spinning process is performed in the following manner: while rotating a workpiece W at a workpiece rotating speed $n_w$, a rotary cutting tool 1 rotating around an axis at a tool rotating speed $n_t$ is biased against workpiece W and is moved at a feed rate f. Rotary cutting tool 1 is constituted of: a rotary cutting tool insert 2 attached to a tip portion of rotary cutting tool 1; and a holder 3. Rotary cutting tool insert 2 is fixed to holder 3 not to rotate relative to holder 3.

It should be noted that the configuration of rotary cutting tool insert 2 will be described later.

Figure 2:
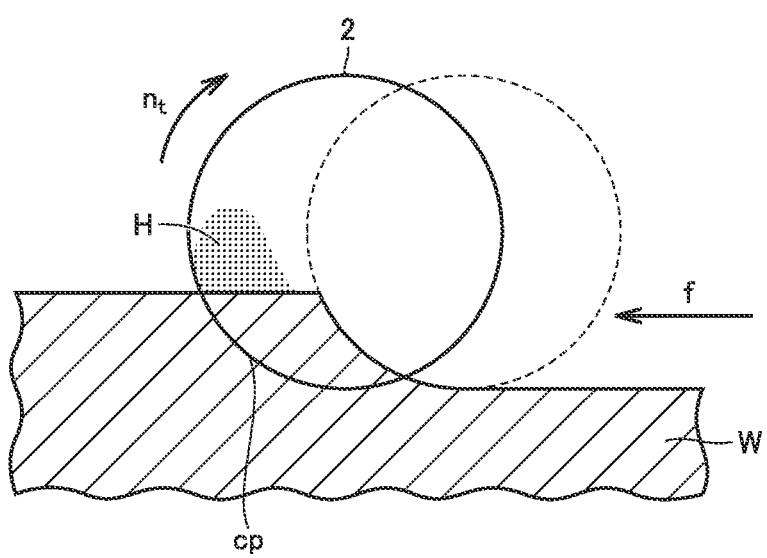
FIG. 2 is a schematic view showing an overview of a spinning process using a rotary cutting tool.

FIG. 2 is a schematic view showing details of a cutting operation using the cutting tool insert and the rotary cutting tool including the cutting tool insert. As shown in FIG. 2, rotary cutting tool insert 2 is brought into contact with workpiece W at a cutting point cp. When workpiece W is rotated relative to rotary cutting tool insert 2 at workpiece rotating speed $n_w$, workpiece W is cut at cutting point cp by a cutting edge continuous in the direction of rotation of the tool.

It should be noted that this cutting causes generation of swarf ch (see FIG. 6) from cutting point cp and a behavior of this swarf ch will be described later.

As shown in FIG. 2, the cutting causes generation of cutting heat H near cutting point cp of rotary cutting tool insert 2. However, since rotary cutting tool insert 2 is rotated at tool rotating speed $n_t$ as shown in FIG. 2, generated cutting heat H is dissipated by the time the point at which cutting heat H has been generated becomes cutting point cp again as a result of rotation. Thus, due to the rotation of rotary cutting tool insert 2, cutting point cp is changed moment by moment at rotary cutting tool insert 2, whereby cutting heat H and cutting load are distributed over the entire circumference of rotary cutting tool insert 2.

[Configuration of Rotary Cutting Tool Insert]

Next, the following describes details of the configuration of rotary cutting tool insert 2.

Figure 3:
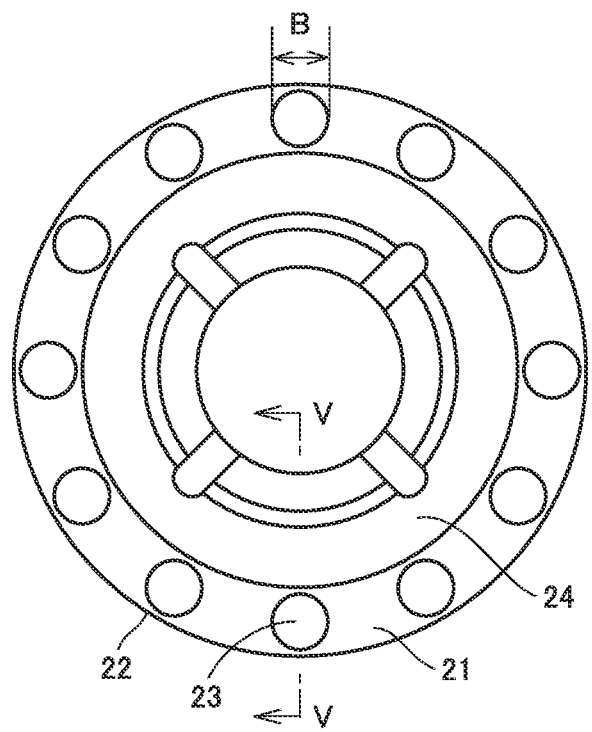
FIG. 3 is a top view of a rotary cutting tool insert according to a first embodiment.

FIG. 3 is a top view of rotary cutting tool insert 2. As shown in FIG. 3, rotary cutting tool insert 2 includes an annular rake face 21.

A cutting edge 22 is provided at the outer circumferential end of rake face 21. A recess portion 23 is provided in rake face 21. An end of recess portion 23 at the outer circumference side of rake face 21 is formed to be separated from cutting edge 22 by a distance L1 (see FIG. 5). It should be noted that distance L1 is preferably more than or equal to 0.1 mm and less than or equal to 0.5 mm. Although the planar shape of recess portion 23 is preferably a circular shape, the shape thereof is not limited particularly. The number of recess portions 23 is preferably 1, and is more preferably more than or equal to 8 and less than or equal to 15. Width B of recess portion 23 in the circumferential direction of rake face 21 is not limited but is preferably more than or equal to 1.2 mm and less than or equal to 3.0 mm. Furthermore, a level difference 24 is provided inwardly of rake face 21.

Figure 4:
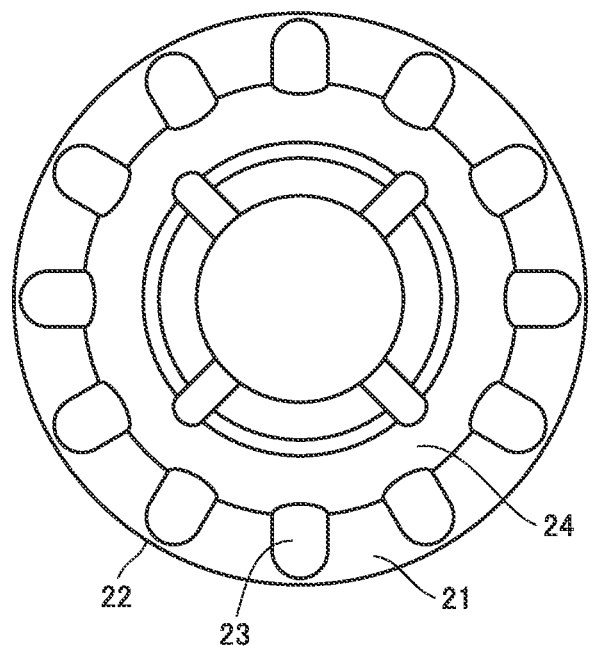
FIG. 4 is a top view of an exemplary rotary cutting tool insert different from the one in FIG. 3.

FIG. 4 is a top view of another exemplary rotary cutting tool insert 2. Rotary cutting tool insert 2 of FIG. 4 includes basically the same configuration as that of the rotary cutting tool insert of FIG. 3, but is different from rotary cutting tool insert 2 of FIG. 3 in that recess portion 23 is formed to extend to reach level difference 24. By forming recess portion 23 in this way, even if the swarf enters the inner circumference side of the recess portion, the swarf is unlikely to hit against the rotary cutting tool insert at the inner circumference side of the rake face. Accordingly, vibration resulting from such hitting can be further suppressed.

Figure 5:
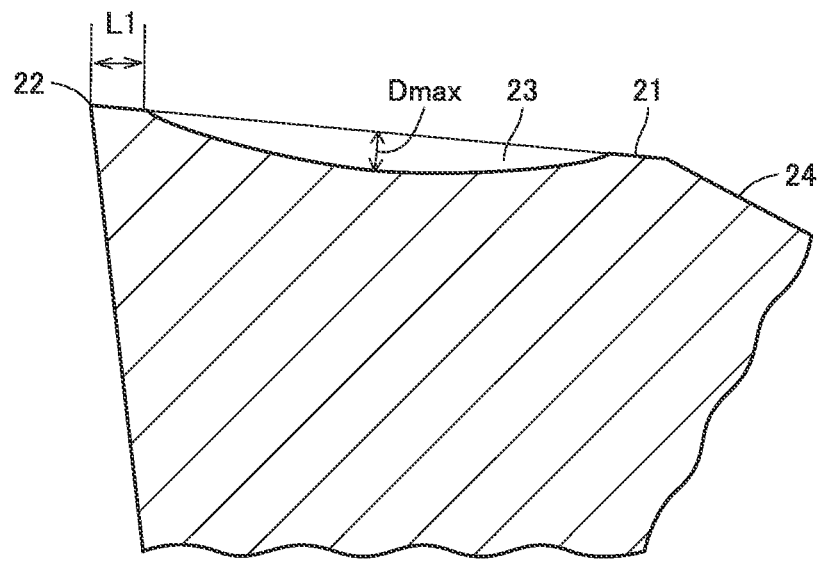
FIG. 5 is a cross sectional view along a V-V cross section of FIG. 3.

FIG. 5 is a cross sectional view of rotary cutting tool insert 2 along a V-V cross section of FIG. 3. As shown in FIG. 5, the end of recess portion 23 at the outer circumference side of rake face 21 is formed to be separated from cutting edge 22 by distance L1. Moreover, as shown in FIG. 5, recess portion 23 has a maximum depth Dmax of more than or equal to 0.15 mm and less than or equal to 0.25 mm relative to rake face 21. Due to recess portion 23 thus provided, the thickness of rotary cutting tool insert 2 is decreased at the portion at which recess portion 23 is provided; however, with such a maximum depth Dmax, the strength of rotary cutting tool insert 2 can be prevented from being insufficient.

The surface roughness of recess portion 23 is preferably an arithmetic mean roughness of less than or equal to 0.5 μm. The surface roughness of recess portion 23 is measured in accordance with JIS B 601-2001. With such a surface roughness of the recess portion, vibration can be further suppressed.

It should be noted that any material may be used for rotary cutting tool insert 2 as long as the material is generally used for a metal processing tool. Examples thereof include tool steel, cemented carbide, cermet, ceramic, and CBN (boron nitride). Each of these materials may be provided with a coating for improved performance.

The material and coating of rotary cutting tool insert 2 are appropriately selected depending on material and cutting condition of the workpiece.

[Behavior of Swarf Due to Use of Rotary Cutting Tool Insert]

The following describes a behavior of the swarf generated by the spinning process employing rotary cutting tool insert 2.

Figure 6:
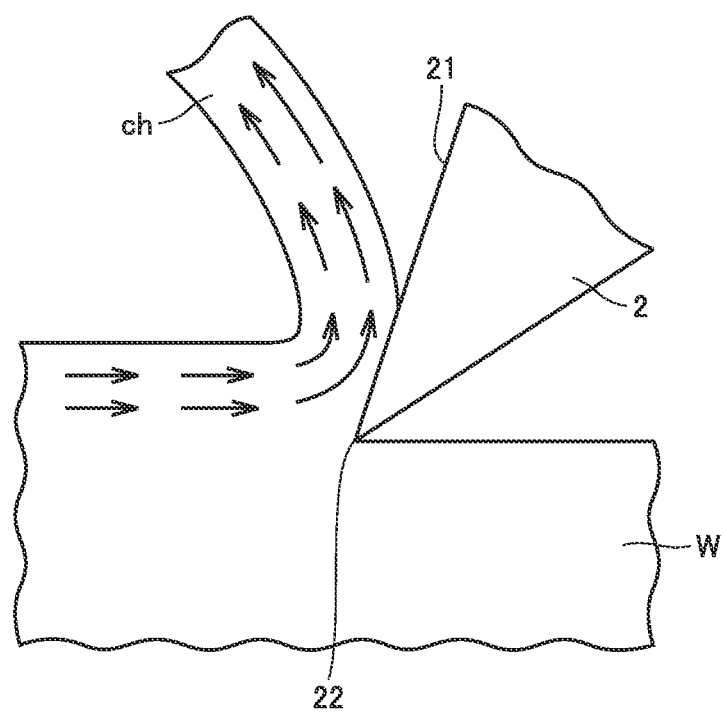
FIG. 6 is a schematic view of a cutting process using a rotary cutting tool insert provided with no recess portion.

FIG. 6 is a schematic view showing a behavior of swarf ch generated by a spinning process employing a rotary cutting tool insert 2 provided with no recess portion 23 and serving as a comparative example. When rotary cutting tool insert 2 provided with no recess portion 23 is used, rake face 21 is flat as shown in FIG. 6, with the result that the swarf from cutting point cp runs without being greatly curved relative to rake face 21. As a result, swarf ch is unlikely to be divided and becomes long.

Figure 7A:
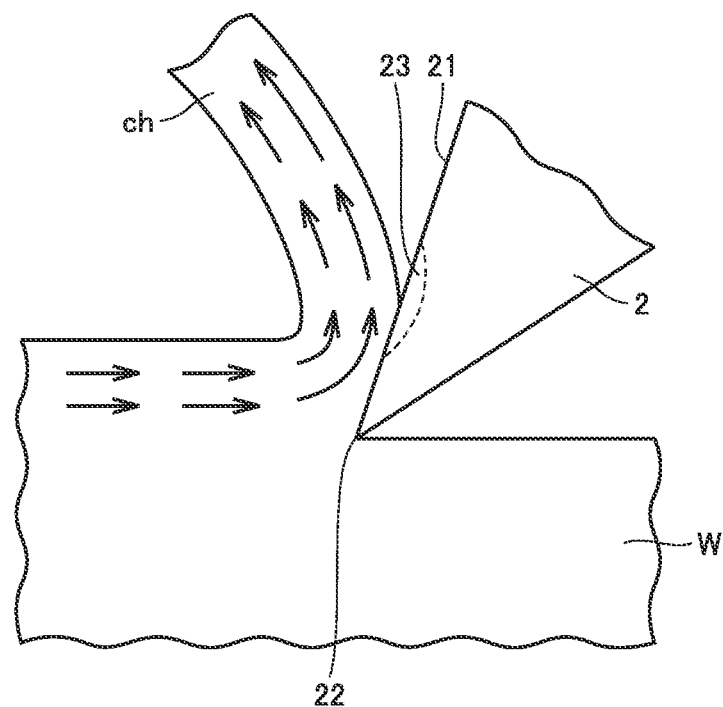
FIG. 7A is a schematic view showing a behavior of swarf before a recess portion in the rake face reaches a cutting point in a cutting process using the rotary cutting tool insert according to the first embodiment.

FIG. 7A shows a behavior of swarf ch before recess portion 23 in rake face 21 reaches cutting point cp in the spinning process employing rotary cutting tool insert 2 provided with recess portion 23. Since rake face 21 is flat as shown in FIG. 7A, the swarf from cutting point cp runs without being greatly curved relative to rake face 21 as with the case where rotary cutting tool insert 2 provided with no recess portion 23 is used.

Figure 7B:
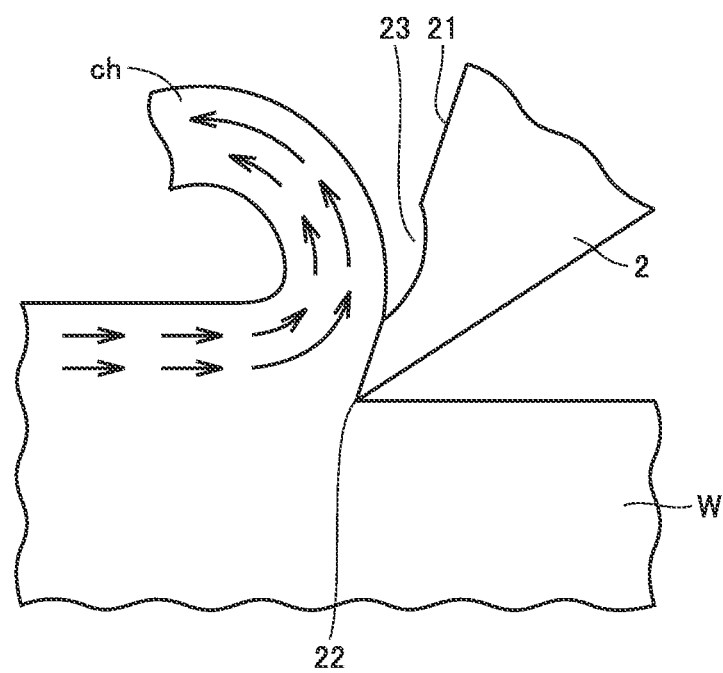
FIG. 7B is a schematic view showing a behavior of swarf when the recess portion in the rake face has reached the cutting point in the cutting process using the rotary cutting tool insert according to the first embodiment.

FIG. 7B shows a behavior of swarf ch after the state of FIG. 7A when recess portion 23 in rake face 21 reaches cutting point cp. As shown in FIG. 7B, in this case, recess portion 23 is in rake face 21 and swarf ch is therefore not brought into contact with rake face 21 in recess portion 23. This reduces friction between the outer side of swarf ch (i.e., surface of swarf ch at the rake face 21 side) and rake face 21, with the result that the outer side of swarf ch runs at a faster speed than that of the inner side of swarf ch (i.e., surface of swarf ch opposite to the outer side thereof). As a result, swarf ch is greatly curved and divided to be short.

Moreover, since the end of recess portion 23 at the outer circumference side of rake face 21 is separated from cutting edge 22 by more than or equal to 0.1 mm and less than or equal to 0.5 mm, recess portion 23 is not brought into contact with cutting point cp. Thus, by providing recess portion 23 in rake face 21 and separating the end of recess portion 23 at the outer circumference side of rake face 21 from cutting edge 22 by a predetermined distance, swarf ch can be divided to be short while suppressing the cut surface from being rough.

[Width of Recess Portion]

Next, the following describes width B of recess portion 23 provided in rake face 21, in the circumferential direction of rake face 21.

Figure 8:
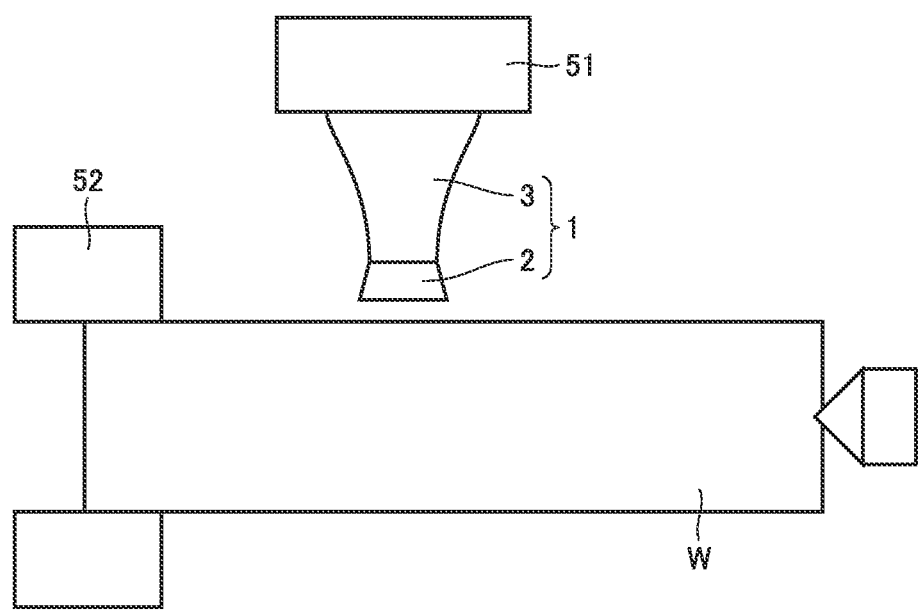
FIG. 8 is a schematic view of a test process for evaluating a relation between a width of the recess portion in a circumferential direction of the rake face and each of swarf divisibility and cutting vibration.

FIG. 8 is a schematic view showing an overview of a test process for reviewing an influence of a relation between the width of recess portion 23 in the circumferential direction of rake face 21 and each of swarf divisibility and vibration resulting from cutting. As shown in FIG. 8, workpiece W is fixed to a chucking 52 of a processing machine 51. Workpiece W is subjected to a spinning process by rotary cutting tool 1 including rotary cutting tool insert 2 and attached to processing machine 51. Here, the entire length of workpiece W was 300 mm, workpiece rotating speed $n_w$ was set at 200 m/min, tool rotating speed $n_t$ was set at 50 m/min, feed rate f was set at 2.0 mm/rev, a cut-in ap was set at 1.0 mm.

As workpiece W, a cylindrical steel material composed of SCM420 defined in JIS was used. As processing machine 51, NC lathe NLX 2500Y provided by Mori Seiki was used. Further, the following rotary cutting tool inserts were used as rotary cutting tool insert 2: a rotary cutting tool insert provided with no recess portion 23 (sample 1); a rotary cutting tool insert provided with a recess portion 23 having a width B of 0.5 mm in the circumferential direction of rake face 21 (sample 2); a rotary cutting tool insert provided with a recess portion 23 having a width B of 2.0 mm in the circumferential direction of rake face 21 (sample 3); and a rotary cutting tool insert provided with a recess portion 23 having a width B of 4.0 mm in the circumferential direction of rake face 21 (sample 4).

When a test process was performed using sample 1 as rotary cutting tool insert 2, swarf ch with a very small curve was obtained. Moreover, a cutting vibration in the test process using sample 1 as rotary cutting tool insert 2 had a mean amplitude of 0.149 m/s$^2$.

When a test process was performed using each of samples 2 to 4 as rotary cutting tool insert 2, divided swarf ch was obtained as compared with the case where the test process was performed using sample 1. Moreover, as width B of recess portion 23 in the circumferential direction of rake face 21 was wider, more finely divided swarf ch was obtained.

In the test processes using samples 2 and 4, cutting vibrations having mean amplitudes of 0.260 m/s$^2$ and 0.298 m/s$^2$ were exhibited respectively. On the other hand, when sample 3 was used, a cutting vibration having a mean amplitude of 0.206 m/s$^2$ was exhibited.

As such, when samples 2 and 4 were used, the cutting vibrations were relatively large as compared with that in the case where sample 1 was used; however, in the case of sample 3, the cutting vibration was sufficiently suppressed. In view of the above, width B of recess portion 23 in the circumferential direction of rake face 21 is preferably, but not limited to, more than or equal to 1.2 mm and less than or equal to 3.0 mm.

[Number of Recess Portions]

Next, the following describes the number of recess portions 23 provided in rake face 21. The test process shown in FIG. 8 was performed in order to review an influence of a relation between the number of recess portions 23 and each of the swarf divisibility and the vibration resulting from the cutting. For the rotary tool insert, the following rotary tool inserts were used: a rotary tool insert provided with no recess portion 23 (sample 5); a rotary tool insert provided with one recess portion 23 (sample 6); a rotary tool insert provided with two recess portions 23 (sample 7); a rotary tool insert provided with four recess portions 23 (sample 8); a rotary tool insert provided with eight recess portions 23 (sample 9); and a rotary tool insert provided with twelve recess portions 23 (sample 10). It should be noted that the other conditions in the test process were the same as those described above.

In the test processes using samples 5, 6, 7, 8, 9, and 10, cutting vibrations having mean amplitudes of 0.130 m/s$^2$, 0.226 m/s$^2$, 0.202 m/s$^2$, 0.244 m/s$^2$, 0.226 m/s$^2$, and 0.217 m/s$^2$ were exhibited respectively. Moreover, in the test process using sample 5, very long, continuous swarf ch was obtained. In the test process using sample 6, finely divided swarf ch was obtained. In the test process using each of sample 7 and sample 8, swarf ch divided as finely as that in the test process using sample 6 was obtained. In the test process using sample 9, fine swarf ch with a larger curve than that in the test process using sample 6 was obtained. In the test process using sample 10, fine swarf ch with a curve as large as that in sample 9 was obtained.

Thus, it is understood that as the number of recess portions 23 is increased, improvement in the swarf divisibility and the cutting vibration tend to be made. However, when there are too many recess portions 23 (more than or equal to 17, for example), strength is decreased at portions in which these recess portions 23 are provided. In view of this, the number of the recess portions is particularly preferably more than or equal to 8 and less than or equal to 15.

[Maximum Depth of Recess Portion]

Next, the following describes maximum depth Dmax of recess portion 23 provided in rake face 21. The test process shown in FIG. 8 was performed in order to review an influence of a relation between maximum depth Dmax of recess portion 23 and the swarf divisibility. For the rotary tool insert, the following rotary tool inserts were used: a rotary tool insert provided with a recess portion 23 having a maximum depth Dmax of 0.1 mm (sample 11); a rotary tool insert provided with a recess portion 23 having a maximum depth Dmax of 0.2 mm (sample 12); and a rotary tool insert provided with a recess portion 23 having a maximum depth Dmax of 0.4 mm (sample 13). It should be noted that the other conditions in the test process were the same as those described above.

In the test process using sample 11, relatively long, continuous swarf ch was obtained. In the test process using sample 12, sufficiently finely divided swarf ch was obtained. In the test process using sample 13, swarf ch divided more finely than that in the case of using sample 12 was obtained.

Thus, it is understood that as maximum depth Dmax of recess portion 23 becomes larger, the swarf divisibility tends to be improved. However, when maximum depth Dmax of recess portion 23 is too large, strength is decreased at the portion at which recess portion 23 is provided. In view of this, the maximum depth of recess portion 23 is preferably more than or equal to 0.15 mm and less than or equal to 0.25 mm.

The following describes a second embodiment of the present invention with reference to figures. It should be noted that the description here is mainly directed to a difference from the rotary cutting tool insert according to the above-described first embodiment.

Figure 9:
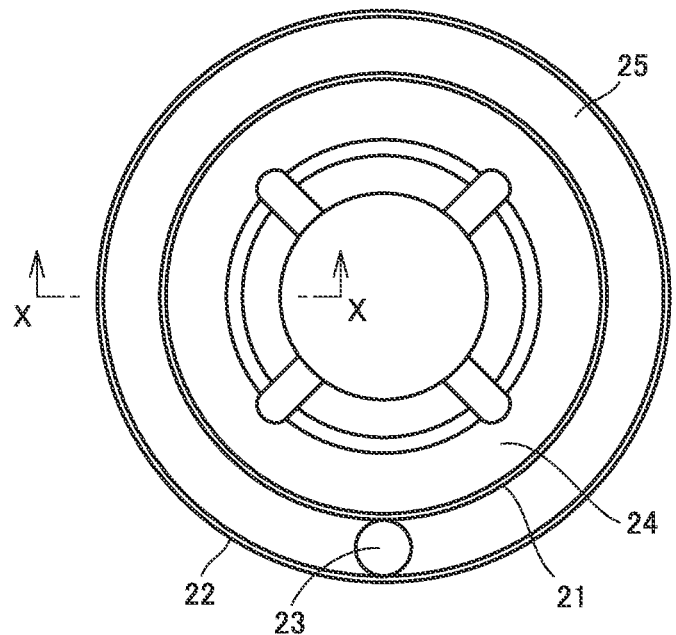
FIG. 9 is a top view of a rotary cutting tool insert according to a second embodiment.
Figure 10:
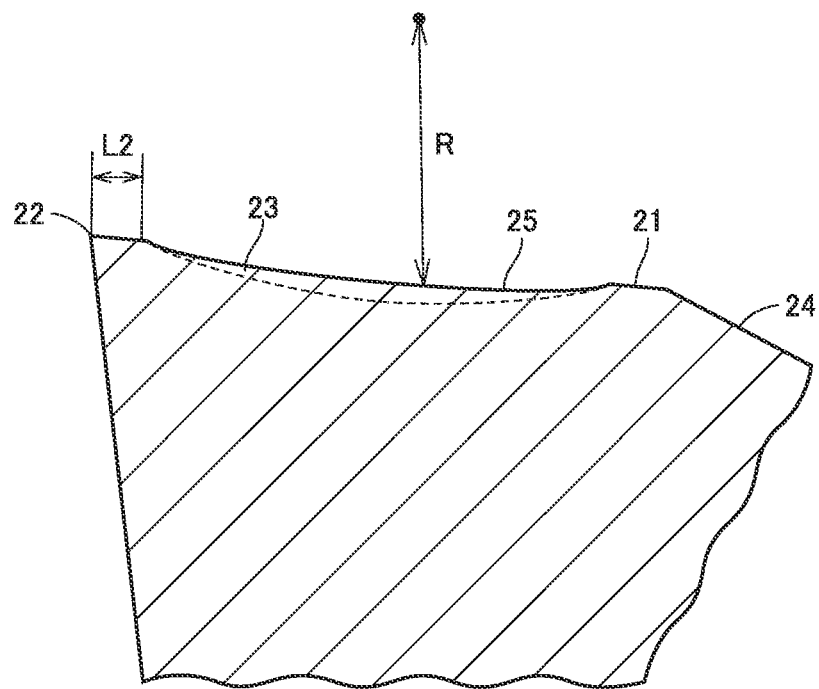
FIG. 10 is a cross sectional view of an X-X cross section of FIG. 9.

FIG. 9 is a top view of a rotary tool insert according to the second embodiment. FIG. 10 is a cross sectional view along an X-X cross section of FIG. 9. In the rotary tool insert according to the second embodiment, an annular breaker groove 25 is formed in rake face 21 as shown in FIG. 9. It should be noted that recess portion 23 is not included in the X-X cross section of FIG. 9 but is illustrated in FIG. 10 for the purpose of reference.

As shown in FIG. 9, the end of breaker groove 25 at the outer circumference side of rake face 21 is formed to be separated from cutting edge 22 by a distance L2. Distance L2 is preferably more than or equal to 0.1 mm and less than or equal to 0.3 mm. Moreover, as shown in FIG. 10, breaker groove 25 has a predetermined curvature radius R in a cross section perpendicular to the circumferential direction. As described below, curvature radius R is preferably more than or equal to 10 mm and less than or equal to 30 mm.

The test process shown in FIG. 8 was performed in order to review an influence of a relation between curvature radius R of breaker groove 25 and each of the swarf divisibility and the vibration resulting from the cutting. For the rotary tool insert, the following rotary tool inserts were used: a rotary tool insert provided with no breaker groove 25 (sample 14); a rotary tool insert provided with a breaker groove 25 having a curvature radius R of 6 mm (sample 15); a rotary tool insert provided with a breaker groove 25 having a curvature radius R of 10 mm (sample 16); and a rotary tool insert provided with a breaker groove 25 having a curvature radius R of 15 mm (sample 17). It should be noted that the other conditions of the test process were the same as described above except that SUS 630, which is a stainless steel material defined in JIS, was used as workpiece W.

A change in curvature radius R has the following influence over a result of dividing of swarf. In the test process using sample 14, very long, continuous swarf ch was obtained. On the other hand, in the test process using sample 15, very finely divided swarf ch was obtained. Moreover, in each of the test processes using samples 16 and 17, sufficiently finely divided swarf ch was obtained although it is long and continuous as compared with that in the case of the test process using sample 15.

Next, a change in curvature radius R has the following influence over the cutting vibration. In the test process using sample 14, the mean amplitude of the cutting vibration was 6.89 m/s$^2$. On the other hand, in the test process using sample 15, the mean amplitude of the cutting vibration was 11.22 m/s$^2$. In the test processes using samples 16 and 17, the mean amplitudes of the cutting vibrations were respectively 7.90 m/s$^2$ and 7.41 m/s$^2$, which were comparable to that in the case of the test process using sample 14.

As such, when curvature radius R is small, breaker groove 25 serves as a breaker to improve the swarf divisibility but the cutting vibration is increased. However, as curvature radius R is larger, the cutting vibration can be suppressed from being increased while improving the swarf divisibility. However, when curvature radius R is too large, breaker groove 25 becomes close to a flat surface. Accordingly, there is no difference from the case where no breaker groove 25 is provided. In view of this, curvature radius R of breaker groove 25 is preferably more than or equal to 10 mm and less than or equal to 30 mm.

Figure 11:
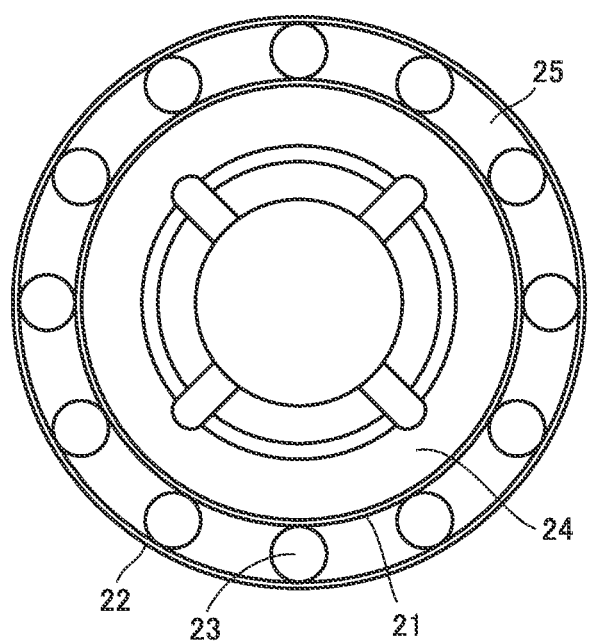
FIG. 11 is a top view of an exemplary rotary cutting tool insert different from the one in FIG. 9.

It should be noted that in each of the above-described test processes, the rotary cutting tool insert provided with one recess portion 23 was used; however, excellent swarf divisibility and cutting vibration are exhibited also when breaker groove 25 is provided in a rotary cutting tool insert provided with a plurality of (for example, 12) recess portions 23 as shown in FIG. 11.

In each of the above-described embodiments, it has been illustrated that rotary cutting tool 1 is constituted of rotary cutting tool insert 2 and holder 3; however, rotary cutting tool 1 may be configured as a solid tool having features similar to those of rotary cutting tool insert 2 described above.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: rotary cutting tool; 2: rotary cutting tool insert; 3: holder; 21: rake face; 22: cutting edge; 23: recess portion; 24: level difference; 25: breaker groove; 51: processing machine; 52: chucking; ch: swarf; cp: cutting point; Dmax: maximum depth of the recess portion; f: feed rate; $n_t$: rotating speed of the rotary cutting tool; $n_w$: rotating speed of the workpiece; B: width in the circumferential direction; L1: distance between the cutting edge and the end of the recess portion at the outer circumference side of the rake face; L2: distance between the cutting edge and the end of the breaker groove at the outer circumference side of the rake face; R: curvature radius; W: workpiece.

The invention claimed is:

1. A rotary cutting tool insert comprising:
   an annular rake face provided with at least one recess portion; and
   a cutting edge formed at an outer circumference of the rake face,
   the recess portion having a width of more than or equal to 1.2 mm and less than or equal to 3.0 mm in a circumferential direction of the rake face,
   a distance between the cutting edge and an end of the recess portion at the outer circumference side of the rake face being more than or equal to 0.1 mm and less than or equal to 0.5 mm,
   wherein the cutting edge is configured to rotate around an axis of the rotary cutting tool insert, and
   wherein the rake face is provided with an annular breaker groove, the breaker groove has a curvature radius of more than or equal to 10 mm and less than or equal to 30 mm in a cross section perpendicular to the circumferential direction, and a distance between the cutting edge and an end of the breaker groove at the outer circumference side of the rake face is more than or equal to 0.1 mm and less than or equal to 0.3 mm.

2. The rotary cutting tool insert according to claim 1, wherein the recess portion has a maximum depth of more than or equal to 0.15 mm and less than or equal to 0.25 mm.

3. The rotary cutting tool insert according to claim 1, wherein a shape of the recess portion is a circular shape.

4. The rotary cutting tool insert according to claim 1, wherein the number of the recess portions is more than or equal to 8 and less than or equal to 15.

5. The rotary cutting tool insert according to claim 1, wherein
the rake face has a width of more than or equal to 1.5 mm and less than or equal to 3.0 mm in a radial direction,
a level difference is provided at an inner circumferential side of the rake face, and
the recess portion extends to reach the level difference.

6. A rotary cutting tool comprising:
the rotary cutting tool insert recited in claim 1; and
a holder that supports the rotary cutting tool insert.

7. A rotary cutting tool insert comprising:
an annular rake face provided with at least one recess portion; and
a cutting edge formed at an outer circumference of the rake face,
the recess portion having a width of more than or equal to 1.2 mm and less than or equal to 3.0 mm in a circumferential direction of the rake face,
a distance between the cutting edge and an end of the recess portion at the outer circumference side of the rake face being more than or equal to 0.1 mm and less than or equal to 0.5 mm,
wherein the rake face has a width of more than or equal to 1.5 mm and less than or equal to 3.0 mm in a radial direction, a level difference is provided at an inner circumferential side of the rake face, and the recess portion extends to reach the level difference.

8. A rotary cutting tool insert comprising:
an annular rake face provided with at least one recess portion; and
a cutting edge formed at an outer circumference of the rake face,
the recess portion having a width of more than or equal to 1.2 mm and less than or equal to 3.0 mm in a circumferential direction of the rake face,
a distance between the cutting edge and an end of the recess portion at the outer circumference side of the rake face being more than or equal to 0.1 mm and less than or equal to 0.5 mm,
wherein the rake face is provided with an annular breaker groove, the breaker groove has a curvature radius of more than or equal to 10 mm and less than or equal to 30 mm in a cross section perpendicular to the circumferential direction, and a distance between the cutting edge and an end of the breaker groove at the outer circumference side of the rake face is more than or equal to 0.1 mm and less than or equal to 0.3 mm.

* * * * *